United States Patent [19]

Sakashita et al.

[11] Patent Number: 5,232,973
[45] Date of Patent: Aug. 3, 1993

[54] HIGH-TEMPERATURE GASKET

[75] Inventors: Keiichi Sakashita; Keiji Yamada, both of Gifu; Kazuhiko Shiratani, Aichi; Takehisa Yaegashi, Shizuoka, all of Japan

[73] Assignees: Toyota Jidosha Kabushiki Kaisha, Toyota; Ibiden Co., Ltd., Ogaki, both of Japan

[21] Appl. No.: 879,534

[22] Filed: May 4, 1992

Related U.S. Application Data

[63] Continuation of Ser. No. 468,746, Jan. 24, 1990, abandoned.

[30] Foreign Application Priority Data

Jan. 24, 1989 [JP] Japan ................................. 1-13177

[51] Int. Cl.⁵ .......................... C08J 3/12; C08K 3/40; C08L 89/00
[52] U.S. Cl. .................................... 524/492; 524/444; 524/445; 524/447; 524/449; 524/451; 524/493
[58] Field of Search ............... 524/444, 445, 447, 449, 524/451, 492, 493

[56] References Cited

U.S. PATENT DOCUMENTS

| 4,373,038 | 2/1983 | Moraw et al. | 524/444 |
| 4,786,670 | 11/1988 | Tracy et al. | 524/492 |

FOREIGN PATENT DOCUMENTS 61-164454 10/1986 Japan .

*Primary Examiner*—George F. Lesmes
*Assistant Examiner*—Kathryne E. Shelborne
*Attorney, Agent, or Firm*—Dvorak and Traub

[57] ABSTRACT

A high-temperature gasket suitable for use in automobile engine or the like is comprised of particular amounts of ceramic inorganic fiber, wollastonite, organic elastomeric substance and inorganic binder, and exhibits excellent sealability and thermal resistance even at a temperature above 950° C. without using asbestos.

7 Claims, No Drawings

HIGH-TEMPERATURE GASKET

This application is a continuation of application Ser. No. 07/468,746, filed Jan. 24, 1990, now abandoned.

BACKGROUND OF THE INVENTION

1. Field of the Invention

This invention relates to a high-temperature gasket, and more particularly to a gasket exhibiting improved sealability and heat resistance under temperature condition exceeding 950° C. for using in an engine of an automobile or the like and consisting mainly of ceramic instead of asbestos.

2. Related Art Statement

In general, the high-temperature gasket used in the above application is composed mainly of asbestos and contains an elastic substance for giving an elasticity such as natural rubber (NR), acrylonitrilebutadiene rubber (NBR), styrene butadiene rubber (SBR) or the like and an additive such as a vulcanizing agent or the like, if necessary.

As such a gasket, there were "joint sheet" like gasket obtained by heating and shaping the asbestos and the elastic substance, and "beater sheet" like gasket obtained by shaping an emulsion of asbestos and elastic substance or a latex-like slurry.

Since 60-95% by weight of asbestos fiber is included in these known gaskets, such asbestos fibers are scattered not only at the production step of the gasket but also from the working equipment to cause a fear of health impediment, so that it is demanded to improve the handling of asbestos.

In Japan, the handling of asbestos is regulated by various laws accompanied with the signing of Occupational Cancer Convention on 1974 up to the present. For ins,tance, there are "Rule for Prevention of Impediment through Specified Chemical Substances" enacted on Apr. 1, 1976, and "Lung Cancer or Skin Tumor through Works exposed to Asbestos Atmosphere" in a part of the Labor Standard Rules revised on Mar. 30, 1978 and on cancer origin substance, cancer origin factor or diseases through works at cancer origin step, and the like.

Further, EPA (Environment Protection Agency) in USA proposed the prohibition on the use of asbestos articles on January, 1983, and the use prohibition on building materials on January, 1988 after the comprehension at OMB (Office of Management and Budget), and proposes the complete prohibition on use from 1991.

In this connection, three big gasket makers in USA declared to stepwisedly receive such a proposal on July, 1986.

Besides the above two contries, "Treaty and Recommendation on Safety in Utilization of Asbestos" are internationally discussed and considered in accordance with the proposal of ILO (International Labor Organization) on June, 1986.

Under such an international situation, it is recently attempted to produce gaskets by using inorganic fibers such as sepiolite fiber, glass fiber, carbon fiber, stainless fiber and the like, or organic fibers such as aromatic polyamide fiber, phenolic fiber, polyethylene fiber and the like instead of asbestos fiber.

As mentioned above, the gaskets using the asbestos fiber not only hold pollution problem but also have a drawback that the degradation of strength is caused by dehydration of crystal water at a high temperature of, for example, not lower than 950° C. though good properties are maintained near to 600° C.

On the other hand, the gaskets using the inorganic or organic fibers instead of the asbestos fiber have the following drawbacks.

That is, the inorganic fiber such as sepiolite or the like has crystal water, so that the degradation of strength is caused in a high temperature region likewise the asbestos. Furthermore, when the gasket is produced from the inorganic fiber alone, there is a problem that the tensile strength and the like are poor likewise the gasket using the asbestos fiber. Particularly, the carbon fiber among the inorganic fibers and the organic fibers such as aromatic polyamide fiber, phenolic fiber, polyethylene fiber and the like considerably degrade the fiber properties from about 200° C. and completely carbonize or burn above 400° C. to cause the bonding degradiation, so that they can not be used at a high temperature above 400° C.

SUMMARY OF THE INVENTION

The invention is to simultaneously overcome the problems of the conventional technique, i.e. the degradation of properties as a gasket such as sealability, durability and reliability due to the degradation of tensile strength, elasticity and the like by using ceramic inorganic fibers to improve thermal resistance, using wollastonite to improve tensile strength, elasticity, restoring percentage and thermal resistance, and further using a proper inorganic binder to compensate strength at a high temperature region.

Particularly, according to the invention, gaskets having high thermal resistance and restoring percentage are obtained by using wollastonite.

In the invention developed under the above conception, there is the provision of a high-temperature gasket of beater sheet-like obtained by shaping a slurry and laminating the resulting shaped bodies, said slurry being comprised of 35-80 wt % of a ceramic inorganic fiber, 2-50 wt % of wollastonite, 2-25 wt % of an organic elastomeric substance and 5-35 wt % of an inorganic binder.

DESCRIPTION OF THE PREFERRED EMBODIMENTS

The gasket according to the invention is a beater sheet-like gasket obtained by dispersing ceramic inorganic fiber, wollastonite, organic elastomeric substance and inorganic binder into an aqueous solution to form an emulsion or further mixing with an additional additive such as vulcanizing agent or the like, if necessary, shaping the resulting emulsion by means of a shaping machine and laminating the resulting shaped bodies one upon the other at a given thickness. Recently, the beater sheet-like gasket is high in the uniformity as compared with the cohventional joint sheet-like gasket and is used within a wide range.

One of components constituting the gasket according to the invention is ceramic inorganic fiber. This fiber is an artificial inorganic fiber, which includes silica-alumina series ceramic fiber, crystalline fiber of alumina or mullite, silica fiber and the like. When the requirement on thermal resistance is low or the service temperature is, for example, not higher than 300° C., it is also possible to use very thin glass fiber.

Such a ceramic inorganic fiber may contain non-fibrous substance usually called as "shot". This non-fibrous substance "shot" does not contribute too much to improve the properties of the gasket, so that it is favorable not to include the shot in the fiber. Therefore, it is desirable to control the non-fibrous substance of not less than about 44 μm contained in the fiber to not more than 20% (to the fiber). Further, the diameter of the ceramic inorganic fiber is desirable to be less than 12 μm. The reason why the size of the fiber is limited to the above is as follows. That is, when the diameter of the fiber is not less than 12 μm, the amount of fiber per unit area becomes less to lower the sheet density and also the breakage is apt to be caused in a press step after the shaping to degrade air tightness (sealability) or tensile strength. Particularly, the fiber diameter is advantageous to be 1-3 μm.

Since the gasket is generally required to have an excellent restoring property, the inorganic fiber is necessary to have excellent rigidity and a holdability as a sheet.

The high-temperature gasket according to the invention contains 35-80 wt % of the ceramic inorganic fiber having the aforementioned properties. When the amount of the inorganic fiber is less than 35 wt %, the restoring percentage at high temperature and tensile strength lower, while when it exceeds 80 wt %, the fibers are apt to be broken and hence the tensile strength lowers and also the air tightness is degraded.

In the high-temperature gasket according to the invention, wollastonite is included at an amount of 2-50 wt % for improving the tensile strength, elasticity, restoring percentage and thermal resistance.

That is, wollastonite does not contain crystal water, so that there is caused no shrinkage based on the change of structure such as dehydration oxidation, crystallization or the like as in asbestos or sepiolite even at a high temperature. Further, it has a property not losing the fiber strength and is excellent in the thermal resistance as compared with plastic fiber or carbon fiber. Moreover, it does not badly affect human body different from asbestos.

Such a wollastonite is usually produced in India, China and so on, and has two shapes of scale-like α-type and needle-like β-type. In the invention, the needle-like β-type shape is preferable considering the necessity for entangling the fibers. That is, β-type wollastonite is needle-like, so that the entangling with the ceramic inorganic fiber is accelerated, which becomes advantageous in view of the tensile strength and elasticity.

The wollastonite is natural mineral, so that it contains a slight amount of impurities, but the kind or amount of the impurities included are different in accordance with the district. Therefore, the properties of the sheet-like gasket are delicately influenced in accordance with the district. Considering this point, it is advantageous to use β-type and relatively high purity Indian's wollastonite.

In the gasket, the wollastonite is required to be included in an amount of 2-50 wt %. When the amount of wollastonite is less than 2 wt %, the effect of improving the strength and elasticity is not obtained, while when it is too large, since the fiber length of wollastonite is too short, it exhibits properties near to powder to degrade the resistance to air corrosion, so that it should be not more than 50 wt %. Preferably, the amount is 10-35 wt %. Moreover, it is desirable to use a fiber having an average aspect ratio of not less than 15.

As the inorganic binder, use any be made of montmorilonite, clay, talc, kaolinite, synthesized fluorine tetrasilicide type mica and the like. Among these substances, montmorilonite is easy in the swelling with water and excellent in the bonding force, so that it is effective in the strength holding above 400° C. and is preferable.

The montmorilonite is usually a main component of bentonite ore naturally produced, which is roughly divided into Na-montmorilonite having rich Na ion and high swellability by absorbing a large amount of water and Ca-montmorilonite having rich Ca and Mg ions and a low swellability. In addition, there is an activated Na-montmorilonite obtained by treating Ca-montmorilonite with soda. In these montmorilonites, the swellability is exhibited though there is a difference in the swelling degree, which is different from kaolinite, talc and the like as another hydrated silicate aluminum mineral. Particularly, the activated Na-montmorilonite is excellent in the swellability and bonding property, so that it is well adaptable to the invention and is represented by the following chemical formula:

$(OH)_4Si(Al_{3.34}Mg_{0.66})O_{20}—Na_{0.66}$

As the swellable inorganic binding substance having the same performances as in the montmorilonite, there are known sepiolite, synthesized fluorine tetrasilicide type mica, ball clay and the like, which can be used instead of montmorilonite.

The organic elastomeric substance used in the invention is a substance particularly useful as a gasket composition, which preferably includes organic elastomers usually used, such as emulsion of natural rubber, binder of synthesis rubber latex such as NBR, SBR or the like. Moreover, in order to improve the durability and strength of the rubber latex, a vulcanizing agent (such as sulfur, sulfur chloride) or the like may be used. In the invention, however, the strength, elasticity and restoring percentage can be ensured by the inorganic binder such as montmorilonite as well as wollastonite, so that the elastomeric substance is used as an assistant.

The organic elastomeric substance is burnt or carbonized at a high temperature to degrade the properties of the gasket, so that the amount of the elastomeric substance is preferable as small as possible. Particularly, the amount is favorable to be 2-25 wt % from a viewpoint of the necessity for sheet shaping.

The amount of the inorganic binding substance is restricted in view of the required performances and production method. If the amount is lacking, the given strength is not obtained and also the shaped sheet becomes ununiform. If the amount is too large, the coagulation of rubber latex becomes insufficient owing to the swellability with water, and consequently filtration is poor and the sheet-like product can not be obtained. Furthermore, the mixing ratio of the fiber material is restricted to badly affect the strength and elasticity, so that the amount of inorganic binder is critical. From these facts, the amount of the inorganic binder is suitable to be within a range of 5-35 wt %.

According to the invention, an inorganic substance having no swellability but expecting the bonding force such as kaolinite $[Al_2Si_2O_5(OH)_4]$ or the like may be added as a reinforcing agent in addition to the above components.

In the invention, the gasket composition having the above mixing ratio is shaped and pressed to form a sheet-like product (gasket). This product has a density of 0.4 g/cm$^3$-2.0 g/cm$^3$ and is a high-temperature gasket exhibiting excellent thermal resistance, tensile strength, elasticity, restoring percentage and the like.

In general, the properties of the gasket such as tensile strength, elasticity, restoring percentage and the like are dependent upon the density. Particularly, when the density of the gasket according to the invention is more than 2.0 g/cm$^3$, the inorganic fibers are broken and there is a fear of degrading the tensile strength, elasticity, restoring percentage and the like. As a result of the inventors' studies, the density is preferable to be within a range of 0.6 g/cm$^3$ -1.4 g/cm$^3$.

Moreover, in order to produce the gasket having such a density, it is previously advantageous to conduct hot pressing after the wet mixing, shaping, dehydrating and drying. That is, the fluidizability is caused in the organic elastomeric substance such as rubber or the like by the hot pressing, whereby the reduction of aspect ratio in the inorganic fiber due to the breakage can be prevented to easily provide the aforementioned preferable density.

The gasket according to the invention is effectively used as a wrap gasket wrapped with a metal plate such as SUS 304 or the like, or as a steel vest gasket containing the metal plate as a core, or even in case of covering an opening portion of the gasket sheet with a metal grommet.

The following examples are given in illustration of the invention and are not intended as limitations thereof.

EXAMPLE 1

Silica-alumina series ceramic fibers having a composition of SiO$_2$: 50 wt % and Al$_2$O$_3$: 50 wt % and an average fiber diameter of 1.8 μm (trade name: IBIWOOL, made by IBIDEN CO., LTD.) were subjected to a treatment for removal of shot, whereby a shot content of not less than 44 μm was restricted to not more than 20%. Then, 55 g of such fibers were disentangled in 30 l of water.

To this water were further added 15 g of wollastonite having an average fiber diameter of 8 μm and an aspect ratio of 30 (trade name: Kemolit) and 30 g of Na-montmorilonite, which were well mixed and added with 54 g of NBR series latex (trade name: NIPOL 1562, made by NIHON ZEON CO., LTD.) and then aggregated on a sulfuric acid band to form a slurry.

The resulting slurry was shaped into a wet sheet-like product of 8 mm in thickness by means of a shaping machine of 340 mm×340 mm. The sheet-like product was pressed under a surface pressure of 300 kgf/cm$^2$ and the dried at 120° C. for 1 hour. The dried sheet was hot pressed at a temperature of 300° C. under a surface pressure of 60 kgf/cm$^2$ for 15 minutes. The end portions of the sheet were cut off to obtain a sheet-like article having a thickness of 0.8 mm, a square of 300 mm and a density of 1.25 g/cm$^3$. The mechanical properties of the article are shown in the following Table 1.

EXAMPLE 2

The same procedure as in Example 1 was repeated by using the same starting materials as in Example 1 except that the mixing ratio of the starting materials was 55 g of silica-alumina fiber, 30 g of wollastonite, 30 g of Na-montmorilonite and 54 g of NBR series latex, whereby a sheet-like article having a thickness of 0.9 mm, a square of 300 mm and a density of 1.24 g/cm$^3$ was obtained. The mechanical properties of the article are shown in Table 1.

EXAMPLE 3

The same procedure as in Example 1 was repeated by using the same starting materials as in Example 1 except that the mixing ratio of the starting materials was 55 g of silica-alumina fiber, 5 g of wollastonite, 30 g of Na-montmorilonite and 54 g of NBR series latex, whereby a sheet-like article having a thickness of 0.75 mm, a square of 300 mm and a density of 1.27 g/cm$^3$ was obtained. The mechanical properties of the article are shown in Table 1.

EXAMPLE 4

The same procedure as in Example 1 was repeated by using the same starting materials as in Example 1 except that the mixing ratio of the starting materials was 60 g of silica-alumina fiber, 30 g of wollastonite, 30 g of Na-montmorilonite and 22 g of NBR series latex, whereby a sheet-like article having a thickness of 0.8 mm, a square of 300 mm and a density of 1.40 g/cm$^3$ was obtained. The mechanical properties of the article are shown in Table 1.

COMPARATIVE EXAMPLE 1

The same procedure as in Example 1 was repeated except that 55 g of silica-alumina fiber, 30 g of Na-montmorilonite and 54 g of NBR series latex were mixed with 15 g of carbon fiber (trade name: KURECA) instead of wollastonite, whereby a sheet-like article having a thickness of 0.8 mm, a square of 300 mm and a density of 1.24 g/cm$^3$ was obtained. The mechanical properties of the article are shown in Table 1.

COMPARATIVE EXAMPLE 2

The same procedure as in Example 1 was repeated except that 55 g of silica-alumina fiber, 30 g of Na-montmorilonite and 54 g of NBR series latex were used without wollastonite, whereby a sheet-like article having a thickness of 0.7 mm, a square of 300 mm and a density of 1.25 g/cm$^3$ was obtained. The mechanical properties of the article are shown in Table 1.

COMPARATIVE EXAMPLE 3

The same procedure as in Example 1 was repeated by using the same starting materials as in Example 1 except that the mixing ration of the starting materials was 30 g of silica-alumina fiber, 84 g of wollastonite, 17 g of Na-montmorilonite and 29 g of NBR series latex, whereby a sheet-like article having a thickness of 1.0 mm, a square of 300 mm and a density of 1.24 g/cm$^3$ was obtained. The mechanical properties of the article are shown in Table 1.

TABLE 1

| | Example 1 | Example 2 | Example 3 | Example 4 | Comparative Example 1 | Comparative Example 2 | Comparative Example 3 |
|---|---|---|---|---|---|---|---|
| Composition | | | | | | | |
| silica-alumina-fiber | 45.0% | 40.1% | 49.1% | 46.5% | 45.0% | 51.3% | 21.4% |
| Na-montmori- | 24.6% | 21.9% | 26.8% | 23.3% | 24.6% | 28.0% | 11.7% |

TABLE 1-continued

|  | Example 1 | Example 2 | Example 3 | Example 4 | Comparative Example 1 | Comparative Example 2 | Comparative Example 3 |
|---|---|---|---|---|---|---|---|
| lonite |  |  |  |  |  |  |  |
| wollastenite | 12.3% | 21.9% | 4.5% | 23.3% | — | — | 58.3% |
| carbonfiber | — | — | — | — | 12.3% | — | — |
| emulsion latex | 18.1% | 16.1% | 19.7% | 6.9% | 18.1% | 20.6% | 8.6% |
| Density (g/cm$^3$) | 1.25 | 1.24 | 1.27 | 1.40 | 1.24 | 1.25 | 1.24 |
| Tensile strength |  |  |  |  |  |  |  |
| room temperature (kg/cm$^2$) | 171 | 163 | 184 | 153 | 190 | 192 | 80 |
| (700° C. × 2 hr) | 40 | 35 | 46 | 43 | 18 | 50 | 16 |
| Compressibility (under load of 350 kg/cm$^2$) |  |  |  |  |  |  |  |
| room temperature | 24% | 20% | 28% | 19% | 16% | 34% | 16% |
| (700° C. × 2 hr) | 37% | 32% | 42% | 29% | 52% | 48% | 27% |
| Restoring Percentage (under load of 350 kg/cm$^2$) |  |  |  |  |  |  |  |
| room temperature | 34% | 39% | 29% | 42% | 52% | 21% | 35% |
| (700° C. × 2 hr) | 25% | 29% | 18% | 35% | 13% | 13% | 29% |
| Torque down (800° C. × 2 hr) | 34 | 30 | 37 | 23 | 51 | 52 | 35 |

As seen from Table 1, when the greater amount of wollastonite is added (Comparative Example 3), the fiber amount increases, so that the compression-restoring percentage are good, but the effect of Na-montmorilonite added becomes less to lower the tensile strength.

In case of the sheet using no wollastonite (Comparative Example 2), the effect of Na-montmorilonite is large, so that the bonding force is strong and the tensile strength is large. However, the fiber amount becomes less due to the absence of wollastonite and the compression-restoring percentage are low. Moreover, when wollastonite is used in an amount outside the range defined in the invention, if the amount is too large, the tensile strength lowers, and consequently the expansion and contraction through heat can not be followed in applications for engine body and the like, while if the amount is zero, the compression-restoring percentage are low and the good sealability is not obtained. Therefore, it is understood that wollastonite should be used in an amount of 2-50% by weight.

In the sheet using carbon fiber instead of wollastonite (Comparative Example 1), since the carbon fiber exhibits high strength and elasticity at a temperature region of not higher than 400° C., good properties are exhibited at a lower temperature zone as compared with the sheets using wollastonite (Examples 1 -4). However, since the carbon fiber is poor in the thermal resistance, the properties of the carbon fiber are lost at a high temperature zone of not lower than 400° C., and consequently the tensile strength and compression-restoring percentage are rather degraded. In this sense, the use of carbon fiber is not suitable for gaskets used at a high temperature zone under an oxidizing atmosphere.

In order to examine the performances of the sheet-like gasket according to the invention, the sheet of Example 1 was punched out in a given size, which was arranged as a gasket between a cylinder head and an exhaust manifold in an automobile engine having a displacement of 2000 cc and provided with DOHC turbocharger. Then, the durability test was made by passing an exhaust gas through the exhaust manifold at an exhaust gas temperature of 900° C. for 100 hours. During this test, there was caused no serious problem such as gas leakage or the like, so that the sheet of Example 1 sufficiently developed the performance as a gasket.

As mentioned above, according to the invention, the high-temperature gaskets can be obtained without using asbestos harmful to human body. Furthermore, they are excellent in the gas sealability, heat insulating property, resistance to air corrosion and the like because the disappearance of fiber or powder formation thereof through burning oxidation is not caused even at a temperature of not lower than 950° C.

As a result, the invention has the following additional effects for use in automobiles.

(1) Since the exhaust manifold reduces heat quantity to the cylinder head, the quantity of heat transferred to a cooling water/passing through the cylinder head is reduced, so that it is possible to make a size of a radiator and the engine room can effectively be utilized at a low cost.

(2) The temperature rises at a flange face contacting the exhaust manifold with the cylinder head as compared with the conventional technique and the heat distribution becomes uniform, so that the cost can be reduced by the thin formation of the flange portion based on the mitigation of heat strain at the flange face. Further, the gas temperature inside the exhaust manifold rises, so that the exhaust emission can be reduced to highly activate the catalyst.

(3) The rise of the exhaust temperature in the above item (2) changes the exhaust heat into a work done in an engine provided with a turbocharger, and consequently the output of the engine can be enhanced.

What is claimed is:

1. A beater sheet-like gasket operable at high temperatures of 900° C. or above obtained by shaping a slurry and laminating the resulting shaped bodies, said slurry consisting essentially of 35-80 wt % of a ceramic inorganic fiber, 2-50 wt % of needle-like wollastonite, 2-25 wt % of an organic elastomeric substance and 5-35 wt % of an inorganic binder.

2. The high-temperature gasket according to claim 1, wherein said ceramic inorganic fiber is selected from the group consisting of silica-alumina series ceramic fiber, alumina crystalline fiber and mullite crystalline fiber and has a fiber diameter of less than 12 μm.

3. The high-temperature gasket according to claim 1, wherein said wollastonite has an average aspect ratio of not less than 15.

4. The high-temperature gasket according to claim 1, wherein said wollastonite is used in an amount of 10–35 wt %.

5. The high-temperature gasket according to claim 1, wherein said inorganic binder is selected from the group consisting of montmorilonite, clay, talc, kaolinite and synthesized fluorine tetrasilicide type mica.

6. The high-temperature gasket according to claim 1, wherein said organic elastomeric substance is a synthetic rubber latex.

7. The high-temperature gasket according to claim 1, wherein said gasket has a density of 0.4–2.0 g/cm$^3$.

* * * * *